United States Patent [19]

Norek

[11] 4,408,850
[45] Oct. 11, 1983

[54] DRAWING TABLE

[76] Inventor: George G. Norek, 8534 Roseview Dr., Niles, Ill. 60648

[21] Appl. No.: 291,274

[22] Filed: Aug. 10, 1981

[51] Int. Cl.³ .............................................. G03B 21/10
[52] U.S. Cl. .................................... 353/122; 353/98; 353/119; 33/1 M; 33/1 AA
[58] Field of Search ................. 40/361; 350/121–123; 353/44, 74–79, 119, 122, 98; 33/1 M, 20 R, 430, 435, 438; 108/6, 23, 8

[56] References Cited

U.S. PATENT DOCUMENTS

| | | | |
|---|---|---|---|
| 997,418 | 7/1911 | Sayles | 33/1 AA |
| 2,010,551 | 8/1935 | McConalogue | 40/361 |
| 2,215,462 | 9/1940 | Davidson et al. | 108/23 X |
| 3,311,070 | 3/1967 | Barzee et al. | 108/23 |
| 3,837,740 | 9/1974 | Johnson | 353/122 |
| 3,950,085 | 4/1976 | Grimm | 353/77 |
| 4,314,407 | 2/1982 | Kawahara | 33/444 |
| 4,346,260 | 8/1982 | Kaufmann | 33/1 M X |

FOREIGN PATENT DOCUMENTS

| | | | |
|---|---|---|---|
| 664164 | 6/1963 | Canada | 353/44 |
| 562035 | 8/1923 | France | 353/77 |

Primary Examiner—Harry N. Haroian
Attorney, Agent, or Firm—Joan I. Norek

[57] ABSTRACT

The present invention provides a drawing table for use in the fields of drafting, architecture, computer graphics, and graphic arts and the like wherein the drawing table includes means allowing projection of an optical image from below onto the working surface of the table at a plurality of angles of impingement allowing the image to be traced and/or overlaid with another image at the working surface without interference with the optical image from the body or instruments of a worker positioned over the working surface and allowing the optical image to be distorted to other perspectives as desired and allowing scale variations by movement of the components of the table substantially along the horizontal or at inclines from the horizontal, and permitting the working surface of the table to be disposed at inclines from the horizontal without loss of the other advantages.

7 Claims, 7 Drawing Figures

DRAWING TABLE

TECHNICAL FIELD OF THE INVENTION

The present invention is in the technical field of drawing tables, i.e., apparatus providing a working surface upon which drawings, graphic arts designs, and other visual images are committed to paper, canvas, or other similar medium or less tangible media such as through a data input terminal to a computer storage bank or to a computer graphic display means. The present invention, more particularly, is in the technical field of such drawing tables wherein an image is optically projected onto the working surface to facilitate tracing thereof.

BACKGROUND OF THE INVENTION

Tracing at least parts of an already existing image is an important aspect of the many drawing and reproduction fields. It is a means of reproducing images for drafting purposes, fine arts, and the like, allowing an image or parts thereof to be transferred from one medium to another, for instance from a photograph to paper or canvas.

Many techniques of tracing are known. Exemplitive thereof is the technique of placing paper or some other medium of sufficient transparency directly over an image, allowing the lines of the image to be seen through the transparency and thus allowing direct tracing of the image onto the transparency. This technique only permits reproduction of the image as it appears on the medium below the transparency, precluding even image scale variations.

Another example is an apparatus that optically projects an image onto a drawing medium from above. With such apparatus, the image projected usually can be varied as to scale at the drawing medium by changing the distance between the projecting means and the drawing medium and, to a limited extent, by the use of specialized lenses.

Since working surfaces are normally used disposed horizontally or at an incline from the horizontal, up to an angle approaching the vertical, such drawing tables with overhead image projectors present at least two significant disadvantages. First, even if the working surface is horizontal, and the image projection is strictly along the vertical, there will be interference with the optically-projected image cast onto the drawing medium from the body of the worker and/or his drawing instruments when, for example, his hand and pencil move into the path of the projection to perform the tracing. If the working surface is elevated to an inclined position, the image projection, in order to impinge along the normal, would need to be slanted, causing an even greater degree of interference by the body of a normally erect standing or sitting worker and his instruments. Thus vertical projection onto a horizontal working surface minimizes but does not remove the incidences of body interference, which of course includes interference by drawing instruments being used.

Second, most drawing environments, such as offices, work shops, and the like, are limited in the vertical space available above the working area. Hence, image scale variation dependent on the distance between the projection means and working surface is correspondingly limited. Moreover, elevation of a projection means from a position near the working surface to one a significant distance vertically therefrom would require apparatus of greater sophistication and higher cost than that normally associated with drawing table, such as drafting tables and the like.

Thus minimizing body interference requires the line of optical projection to be along the vertical, and having the line of optical projection along the vertical limits the range of scale variation by the change of the distance between the projection means and the working surface to the vertical space available and the type of practical apparatus available.

Moreover, none of the above described tracing techniques and means provide controlled distortion of the image being reproduced other than image scale variations.

Further, the field commonly known as computer graphics permits the storage, reproduction, and alteration of graphic data by means of a graphic data computer input mens, usually an electronically sensitized tablet or digitizer, on which a design, or lines or points defining the same, is drawn with a stylus. The graphic data is thus fed to a computer which can reproduce the same on a computer graphic display means, such as a television screen, or on a print-out sheet. Alterations in the graphic data can be directed by use of the same tablet. Regardless of whether the image is being for the first instance committed to the computer storage bank or reproduced directly on a graphic display means, the image must first be created or drawn on the tablet. It is to be understood herein that the term "draw" and variations thereof means not only the creation of a visable image by transfer of some tangible material from an instrument to the reproduction medium, such as the transfer of ink from a pen to paper, but also electronic transfer generated by the use of an appropriate instrument, such as a stylus, on an electronically sensitized tablet, or other computer input means, whereby the image so created is capable of being reproduced visually, although no visual reproduction is seen at the site of the computer input means, and similar transfers.

It would be desirable to provide a drawing table with means for projecting an optical image upon the working surface that is not disturbed by the body or instruments of the worker and which permits controlled distortion of the image being reproduced. It would be desirable to provide such a drawing table that is also selectively functional as a light table, i.e., a table whose working surface is illuminated from behind to improve visual display of transparencies or the like when supported on or held close to the working surface. It would be further desirable to provide such a table wherein the working surface can be positioned at a plurality of angles from the horizontal, and wherein the illumination, when selected, can be easily varied as desired.

It would also be desirable to provide a drawing table wherein image scale variations dependent upon the length of the line of projection can be substantially determined by changing the distance between the working surface and the projecting means substantially along the horizontal. It would also be desirable to provide such a drawing table wherein the image projected onto the working surface could be distorted in modes other than image scale variations.

It would also be desirable to provide at least some of the advantages in reproduction and tracing techniques and means enumerated above to the field of computer graphics and further to provide means for overlaying a computer graphics input means with its display means for greater precision in making alterations on graphic data already held by the computer.

It would be desirable to provide a drawing table having one or more of the above enumerated advantages which additionally is easily portable.

DISCLOSURE OF THE INVENTION

The present invention provides a drawing table including a panel having a working surface and means for optically projecting an image onto the panel wherein the projecting means is capable of projecting an image onto the panel at a plurality of angles of impingement, permitting controlled distortion of the image at the panel, and wherein the panel is at least substantially translucent permitting the image to be projected from below, and thus onto the working surface by projection through the panel to the working surface, precluding disturbance of the optical image by the body or the instruments of a worker positioned on the opposite side of the panel from the line of projection. The present invention provides such a drawing table with means for translating the panel to a plurality of positions whereby the working surface can be disposed in a plurality of oblique planes, which feature itself permits variation in image impingement angles while the projecting means is fixed as to the projection angle and further permits positioning the working surface on inclines as desired by the worker without presenting a body or instrument interference problem.

In another embodiment, the present invention provides a drawing table having an at least substantially translucent panel and means for optically projecting an image onto the panel at a plurality of angles of impingement that further includes means for illuminating the panel and means for selecting independent operation of the projecting means and the illumination means, making such a drawing table selectively functional as a light table, i.e., a table whose working surface is illuminated from behind to improve visual display of transparencies and the like when supported on or held close to the working surface. In preferred embodiment, the illuminating means includes a plurality of incandescent lamps and a light diffusing wall disposed between the lamps and panel, with reflector elements disposed adjacent said lamps opposite the light diffusing wall. The drawing table may further include means to feed electric current to the lamps at variable levels, permitting easy adjustment of the illumination level. The illumination means is so spaced apart from the panel, at least during operation of the projecting function, so as not to interfere with the line of image projection.

The present invention also provides a drawing table with an at least substantially transparent panel, which includes means for optically projecting an image onto the panel comprising means for optically projecting an image and means for reflecting an image from the projecting means onto the panel, such as reflecting surface and means to translate the reflecting surface to a plurality of oblique positions whereby image scale variations dependent upon the length of the line of projection can be substantially determined by changing the distance between the panel and the projecting means along the horizontal. For such drawing table, the impingement angle of the image at the panel could be varied by adjusting the position of the projecting means, the reflecting means, the panel, or more than one of these to provide controlled distortion of the image at the panel. Such table can also have the features enumerated above, the combination of means for optically projecting an image and means for reflecting an image from the projecting means onto the panel being a preferred form of the means for optically projecting an image onto the panel.

The present invention also provides a drawing table having one or more of the above enumerated features wherein the panel is at least light transmitting and the panel includes a graphic data computer input means, providing at least some of the advantages in reproduction and tracing techniques enumerated above to the field of computer graphics. In preferred embodiment, the projecting means includes a computer graphics display means which interfaces with the graphic data computer input means of the panel, permitting overlay of the input means and display means for greater precision in making alterations on the graphic data already held by the computer.

The present invention further provides drawing tables having one or more of the above enumerated features wherein the projecting means, illuminating means, and panel with its support means, are separable components, and so constructed so as to provide easy portability. The present invention also provides such drawing tables further including a detachable parallel rule.

The features, embodiments, and advantages of the present invention are further seen from the description of preferred embodiments of the invention that follows.

PREFERRED EMBODIMENTS OF THE INVENTION

Figure 1:
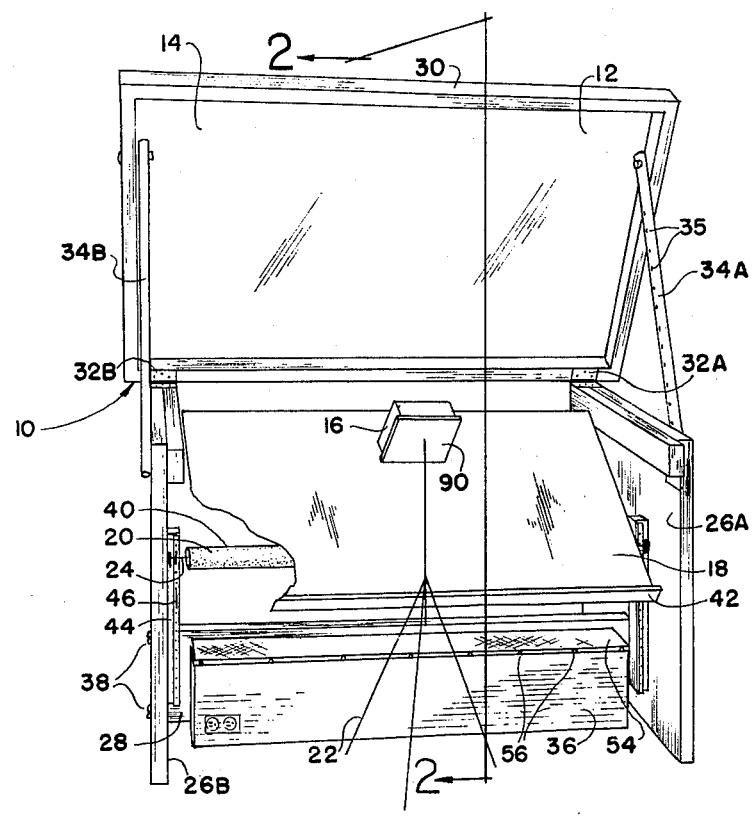
FIG. 1 is a partially cut away perspective view of a drawing table embodying features of the present invention.

The invention, particularly as shown in FIG. 1, is a drawing table, designated generally by the reference numeral 10, which includes a panel 12 having a working surface (not shown) opposite a rear surface 14 of the panel 12 and means for optically projecting an image onto the panel 12 which projecting means is herein embodied in the combination of an adjustably supported projector, a slide projector 16, and a reflecting means, a mirror 18, which mirror 18 is rotatably supported about its upper edge by means described in detail below and supported at an oblique angle by a roller 20 disposed opposite the mirror 18 from the slide projector 16. The slide projector 16 is supported on an adjustable, movable tripod 22 such as are commonly known to those of ordinary skill in the art, which permits the projection therefrom to be directed along a plurality of angles and directions. The slide projector 16 thus can be positioned so as to direct its projection upwards towards, downwards at, and from the side to the mirror 18, or directly towards the mirror 18. The combination of the adjustably supported slide projector 16 and mirror 18 thus constitute a projecting means capable of projecting an optical image onto the panel 12 at a plurality of angles of impingement therewith.

The capability of any form of projecting means to project an image onto the panel 12 at a plurality of angles of impingement therewith provides means for controlling distortion of the image at the panel 12, and as explained below, at the working surface of the panel 12. In short explanation, the scale of an image projected from the slide projector 16 at the panel 12 is dependent upon the length of the light rays' paths from the projector 16 to the panel 12. The longer such paths, the greater the speed of the rays forming the image and the larger the image's scale at the panel 12. When the image projection is along the horizontal, and the mirror 18 is held at a 45° angle from the horizontal, and the panel 12 is positioned along the horizontal, the path of light rays equidistant from the center of the image are the same from the projector 16 to the panel 12, and the image is undistorted when it reaches the panel 12. (Such paths from the projector 16 to the mirror 18, and from the mirror 18 to the panel 12 are not the same; it is the combination of such paths that are the same when an undistorted image is projected at the panel 12.)

If the projector 16 is supported so that its projection line rises at an angle from the horizontal, all other components held in the same position as described immediately above, the light rays above image center travel a loner path to the panel 12 than those below image center and the image is seen at the working surface will be progressively larger in scale from bottom of the image to the top of the image and the image is thus distorted.

The panel 12 is at least substantially translucent, permitting an image projected from below, i.e., onto its rear surface 14, to be viewed from its opposite working surface. If the panel 12 is less light transmitting than transparent, the image will be seen on its bare working surface. If the panel 12 is transparent, the image of course will pass directly through when bare, but will be seen on a tracing medium when placed against the working surface. In any instance, the fact the panel 12 transmits light and thus allows image projection from below (behind the working surface) precludes disturbance of such optical image by the body or the instruments of a worker positioned in front of the table 10 adjacent the working surface, i.e., on the opposite side of the panel 12 from the line of projection.

The roller 20 is shown supported on an axial shaft 24 which is in turn at its ends supported by means (which are described in detail below) protruding from the inner faces of the sides 26a, 26b of the drawing table 10. A support wall 28 spans the space between the panel sides 26a, 26b, and is connected to each. The panel 12 is supported in a frame 30 rotatably secured at its forward edge (opposite the projection means) to each of the top surfaces of the sides 26a, 26b by hinges 32a, 32b. Panel support rods 34a, 34b hold the panel 12 and its frame 30 at the oblique position shown in FIG. 1. These support rods 34a, 34b are adjustable to a plurality of positions, being rotatably secured at one end to the inner face of the frame 30, and detachably secured to the outer face of one of the sides 26a, 26b, such as by having a plurality of egg shaped holes aligned along the length of each rod 34a, 34b which seat upon a knob protruding from the outer face of each of the sides 26a, 26b. Thus the combination of the adjustable support rods 34a, 34b and the hinge arrangement at the forward edge of the frame 30 provide means for translating the panel 12 to a plurality of positions whereby its working surface can be disposed in a plurality of planes, such as vertical, horizontal, and inclines therebetween. Such translation feature itself permits variation in image impingement angles while the projection means (here the tripod supported projector 16 and the mirror 18) is fixed as to projection angle.

Further, the means for translating the panel 12 to a plurality of positions permits the positioning of the working surface at various inclines as desired by the worker without presenting any body or instrument interference problem.

Also shown in FIG. 1 is a means for illuminating the panel 12, embodied in a light box 36 which is disposed rearward of the support wall 28, below the panel 12. As the drawing table 10 is set in FIG. 1 for projection of an image from the slide projector 16, the space between the light box 36 and the panel 12 is at least partially obstructed by the roller 20 and mirror 18. These latter two components are removable as will be shown by the description of their support means below, permitting the light box 36 to illuminate the panel 12 unobstructed and thus the table 12 is useable as a light table for viewing transparencies and the like.

The light box 36 is preferably not structurally interconnected to the other components of the drawing table 10 and thus can easily be removed. When placed as shown, as better shown in some of the other figures, removal of the light box 36 when the table 10 is functioning in its image projecting mode is not necessary, the light box 36 causing no interference to the projecting means.

In FIG. 1 is also shown another preferred construction feature, the use of a plurality of wing nuts 38 to secure the support wall 28 at its ends to the table sides 26a, 26b. As mentioned above, the roller 20 and mirror 18 are preferably detachable from their supporting means which feature permits the unobstructed use of the light box 36 to illuminate the panel 12 from below. These feature in combination in combination with the hinge arrangement at the forward edge of the panel frame 30 and the detachability of the support rods 34a, 34b from the table sides 26a, 26b permit the drawing table 10 to be easily portable. The panel and its frame 30 can be separated can be separated from the other components by detachment of the support rods 34a, 34b and the removal of the pins from the hinges 32a, 32b. (When the panel 12 is inlayed in the frame 30 as shown on some of the other figures, the panel 12 may be lifted out of the frame 30 first. This feature would be important when the panel 12 is formed of breakable material, such as plate glass.)

Two wing nuts 38 or similarly easily removable bolts at each end of the support wall 28 are generally sufficient, and these can be then easily removed, allowing the table support means, i.e., the table sides 26a, 26b and the support wall 28, to be knocked down into separate and flat components.

Figures 2, 3:
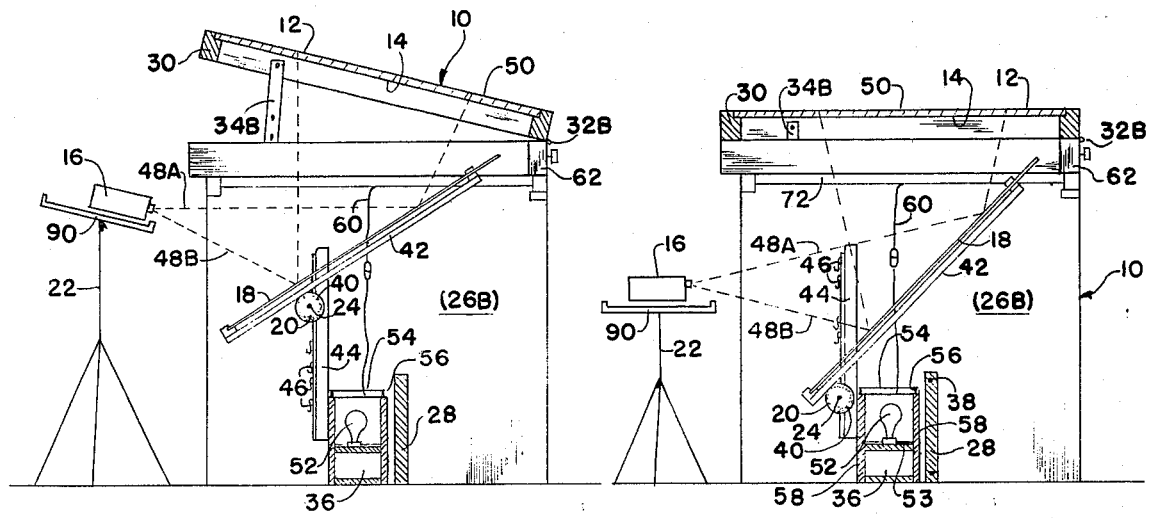
FIG. 2 is a cross sectional side view of the drawing table of FIG. 1 taken along line 2 of FIG. 1 wherein the table panel and projection means are disposed at angles different from that shown in FIG. 1.
FIG. 3 is a cross sectional side view of the drawing table of FIG. 1 taken along line 2 of FIG. 1 wherein the table panel and projecting means are disposed at different angles from that shown in FIGS. 1 and 2.

Referring now particularly to FIG. 2, there is shown in cross sectional side view the drawing table 10 of FIG.

1 with the panel 12 and the projecting means disposed at different angles from that shown in FIG. 1. The panel 12 is held in an oblique angle above the mirror 18 which is supported at an opposite oblique angle by the roller 20 from below. As mentioned above, the roller 20 is supported on an axially disposed shaft 24, and preferably the roller 20 has an outer core 40 of deformable material, such as one of the foams. The mirror 18 of course comprises a means for reflecting an image from the projector 16 to the rear surface 14 of the panel 12 and includes a reflecting surface held by a frame 42.

The roller shaft, as mentioned above, is supported at its ends. This support is preferably provide at each end by a vertically disposed strip 44 having a vertical alignment of hooks or recesses 46 forming shoulders on which the ends of the shaft 24 rest. Each hook or recess 46 has an opposite hook or recess 46 in horizontal alignment therewith on the opposite strip 44 on the opposite table side 26. The roller 20 thus can be placed in a plurality of positions with respect to the vertical and thus is vertically adjustable.

The mirror 18 is both supported from below by the roller 20 and, at its upper edge, by means movable along the horizontal to a plurality of positions along the horizontal, as will be described in detail below.

As shown in FIG. 2, the roller 20 is positioned about two-thirds the way up the strip 42 and the mirror 18 is supported at an oblique angle of about 30° from the vertical, its upper edge being held at a position close to the front edge of the panel 12. The angle at which the mirror 18 is disposed is of course dependent both on the position along the horizontal at which its upper edge is held and the position of the roller 20. Should it be desirable to increase the angle of the mirror 18 from the vertical, here one could either move its upper edge closer to the front edge of the panel 12 or raise the roller 20. Thus the dual adjustment mode increases the angle adjustment capability for given spacial limitations.

Moreover, when the roller 20 is held at a given fixed position, the degree of angle alteration of the mirror 18 for given length of horizontal movement of its upper edge is dependent on the height of the roller 20. Thus having the roller 20 fixed in a high position allows rapid angle adjustment, i.e., a large degree of angle adjustment per unit movement of its upper edge, while having the roller 20 in a low position provides slow angle adjustment, suitable for high precision adjustment.

Further, by providing such a roller 20, vertically adjustable along an alignment that is behind the position of the light box 36, interference with the mirror 18 from that light box 36 is precluded, the mirror being positioned either behind or over the light box 36.

The projection shown in FIG. 2 is undistorted at the panel 12, the phantom outer projection lines being the same length from the slide projector 16 to the panel 12. Here the working surface 50 of the panel 12 is elevated, inclined upwardly from the normal position of a worker in front of the table 10. Such inclined positions are often desired for comfort of the worker. Therefore, to provide undistorted image projection, the angle of the mirror 18 and angle of the projection to the mirror 18 are so adjusted to compensate for the inclined position of the working surface 50.

Referring now particularly to FIG. 3 there is shown the drawing table 10 wherein the panel 12 and its working surface 50 are disposed horizontally. The mirror is held at a 45° angle from the vertical and the projection is along the horizontal. To change the scale of the projected image in this case, i.e., to change the length of the path of projection between the projector 16 and the panel 12, the projector 16 need merely be moved along the horizontal. Move it closer, the image seen at the working surface 50 shrinks. Move it away, that image grows. No means for raising the projector 16 along the vertical is required for increasing the size of the image.

The light box 36 is shown as including at least one incandescent lamp 52, it being understood that other such lamps 52 are disposed forward or behind the lamp 52 shown, and these other lamps 52 are merely not seen in this cross sectional view. The light box preferably includes a light diffusing wall 54, formed of a light diffusing material which such materials are well known to those of ordinary skill in the art, which light diffusing wall 54 is disposed between the lamps 52 and the panel 12 and which is preferably supported by leg means 56 at intervals above the walls 58 of the light box 36, so as to provide vents for ventilation around the lamps 52.

The lamps 52 are connected to generally known source of current in conventional manner, and preferably the electric line 69 thereto includes a means to feed electric current to the lamps 52 at variable levels, permitting easy adjustment of the illumination level. Such variable feed means preferably is a dimmer switch 62 positioned in reasonably close proximity to the normal position of a worker, as shown in FIG. 3.

Figure 4:
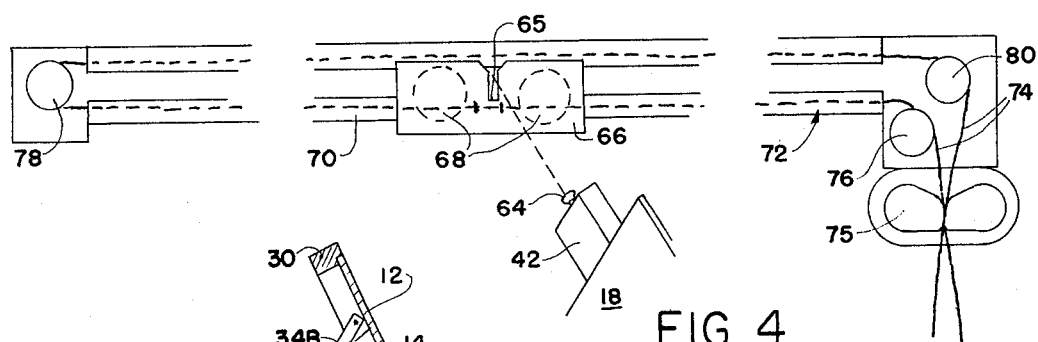
FIG. 4 is an enlarged view of the means supporting the reflecting means of the table of FIG. 1 taken as shown in FIG. 3, embodying features of the present invention.

Also shown in FIG. 3, and better shown in FIG. 4 which is an enlargement of a portion thereof, is the means for supporting the mirror 18 along its upper edge. Screws 64 in the mirror frame 42 protrude at each side thereof in close proximity to the upper edge of the mirror 18, which screws 64 each sit in a notch 65 on a plate 66 which is supported on two plate rollers 68 which run along tracks 70 of a slide 72 secured to the upper inner face of one of the table sides 26a, 26b. A line 74 is secured to the plate 66 and runs from one end through a clamp 75 over a first bearing roller 76, to the plate 66 at the point it is secured, then to a second bearing roller 78 at the far side of the slide 72, back to and through the plate 66, over a third bearing roller 80, and back through the clamp 75. The clamp 75 is positioned close to the normal position of the worker, and therefore so are the ends of the line 74. Movement of the plate 66 and thus the upper edge of the mirror 18 along the horizontal is effectuated be pulling on one end of the line 74 or the other after releasing the ends from the clamp 75. The line 74 is preferably releasable from the clamp 75 by simple manual manipulation, such as movement of the ends of the line 74 downward, and thus a type of clamp that so opens should be used, such as as the cam action jam shown.

FIGS. 3 and 4 of course illustrate the slide 72 on a single side 26b of the table 10 and it is to be understood that a complementary slide arrangement exists on the opposite side 26a of the table 10. When means to move the mirror 18 along the horizontal is as shown, the seating of the screws 64 should preferably have sufficient play to permit variation in speed of movement between the separate sides.

In FIG. 3 is also shown the inlaid arrangement of the panel 12 in its frame 30, permitting the panel 12 to be lifted out of the frame 30 for cleaning or when knocking down the table 10. Also shown in FIG. 3 are reflector elements 53 disposed adjacent the lamps 52, and preferably between the lamps 52, opposite the light diffusing wall 54.

Figure 5:
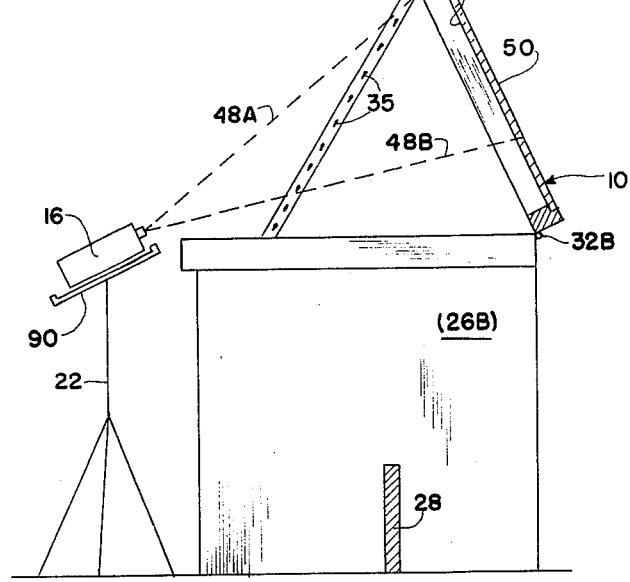
FIG. 5 is a cross sectional side view of a drawing table taken along line 5 of FIG. 6 and embodying features of the present invention.

Referring now to FIG. 5 there is shown another embodiment of the present invention, the table 10 with the panel 12 wherein the means for optically projecting an image onto the panel 12 at a plurality of angles of impingement is a means for more direct projection, without any means for reflecting the image from the projecting means, embodied in the slide projector 16 supported for multiple projection directions on a tripod 22. As shown, the panel's working surface 50 is disposed inclined about 30° away from the vertical and the projection direction is similarly inclined at an elevation of about 30° from the horizontal. The image projected is thus undistorted. To distort the image by making it progressively larger in scale from bottom to top at the working surface 50, the projection direction need only be changed to a greater elevation angle by increasing the elevation angle of the seat 90 of the tripod 22, lowering the height of the tripod 22 if necessary to keep the image centered at the working surface 50. The same distortion effect can be had by decreasing the angle of incline of the working surface 50 from the vertical. Opposite adjustments result in an image progressively smaller in scale from bottom to top at the working surface 50. Move the projector 16 to the side while directing the image toward the center, and the image scale progressively changes from side to side. (These image distortion effects of course can be achieved with the embodiments having a reflecting means interposed between the projector 16 and the panel 12.)

The table 10 is shown with the preferred additional feature of a light box 36 which is here unblocked by any reflecting means. In any embodiment, the light box 36 preferably should have an on/off switch or means separate from that turning on the projection means so as to avoid dimming an image projected by the presence of illumination from the light box 36.

Figure 6:
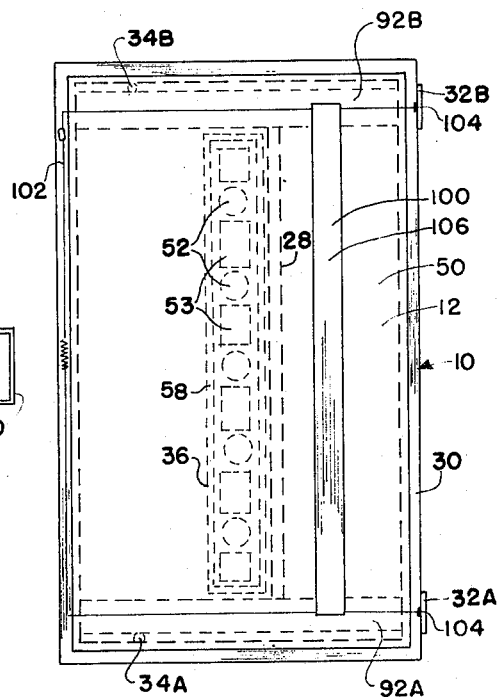
FIG. 6 is a plan view of the drawing table of FIG. 5.

Referring now to FIG. 6 there is shown a plan view of the drawing table 10 as shown in FIG. 5, where there is best seen the plurality of incandescent lamps 52 of the light box 36, which is disposed rearward of the side support wall 28. The sides of both the panel 12 and the panel frame 30 extend over and beyond the upper ends 92a, 92b of the drawing table sides 26a, 26b.

Also as best shown in FIG. 6 is a parallel rule 100 wherein the cord 102 thereof is held at its ends attached to the forward edge of the panel frame 30 by clamps 104 of the type described for the line 74 of the slide arrangement. The ends of the cord 102 are thus releasable by a quick manual pressure upward, allowing cleaning under the rule 106 of the parallel rule 100.

From the foregoing the advantages of the present invention can easily be seen. Projection from behind the working surface 50 allows easy tracing and overlaying of the optical image projected onto the working surface 50 of the panel 12. Controlled distortion permits changing image perspective at will. Scale changes can be made either by movement of the projector 16 along the horizontal or at an incline from the horizontal, rather than solely along the vertical. The incline of the working surface 50 can be varied at will. The table 10 can be converted to a light table merely by turning off the projector 16 and turning on the light box 36, and possibly removing any obstructions from the reflecting means. All these features are provided without problems attendant upon body or instrument interference.

As mentioned above, the panel 12 is at least substantially translucent, permitting image projection through it from its rear surface 14 to its working surface 50. A substantially transparent panel 12 is preferred because such allows the greatest transmission of light through the panel to the rear surface of any tracing medium supported thereagainst, and thus permits the use of tracing mediums of greater density and thickness. When the panel 12 is transparent, artists' canvas can easily be used as the tracing medium. If the panel 12 is substantially transparent, to use the table 10 in its light table function, i.e., to view transparencies with the aid of illumination provided by the light box 36, one need only place a translucent sheet over the transparent panel 12 to avoid the light transmission being entirely through the panel 12 if necessary.

Figure 7:
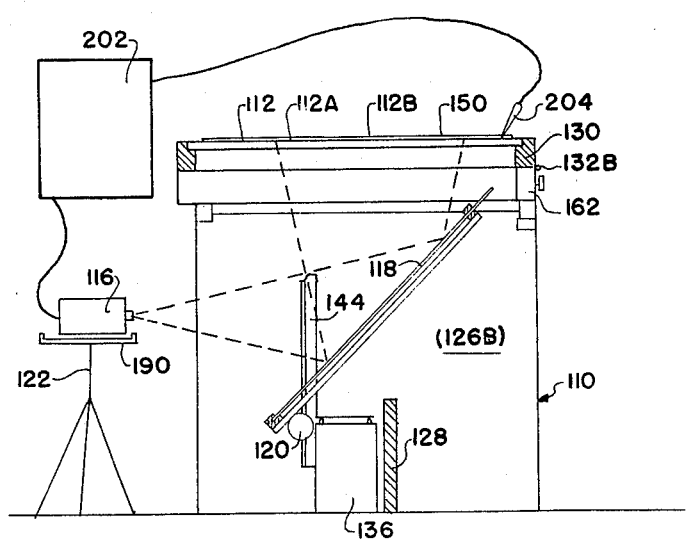
FIG. 7 is a cross sectional side view of a drawing table embodying features of the present invention.

Referring now to FIG. 7 there is shown another embodiment of the present invention, a drawing table 110 incorporating the features described above for the drawing table 10 and further having a panel 112 including a graphic data input means. The panel 112 can be multilayered as shown, comprising of an at least substantially translucent support plate 112a and an at least substantially translucent data input tablet 112b supported thereon. The panel could of course be formed as an integrated support and tablet.

Data input tablets generally are well known in the art, such as the digitizers available from Summagraphics Corporation of Fairfield, Conneticut, which convert graphic information into digital form for input into a computer.

The drawing table 112 is shown in combination with a computer 202 and stylus 204 for drawing on the data input tablet 112b. The combination of the data input tablet 112b and stylus 204 are the means for inputting graphic data into the computer 202.

The table 110 includes an adjustably supported projector 116, such as one supported on a tripod 112 as shown, and preferably means for translating the panel 112 to a plurality of positions whereby the working surface 150 of the panel 112 can be disposed in a plurality of planes.

In preferred embodiment the table 112 includes means for reflecting an image from a projecting means, such as the projector 116, onto the panel 112, such as that embodied in the mirror 118 shown which is supported on a vertically adjustable roller 124 and held and moved horizontally about its upper edge by a slide arrangement as described above. (The details of specific embodiments shown in FIG. 7 are as for their counterparts described above for other embodiments and other figures.)

Many computer graphic systems generally include a computer graphic display means which usually is a screen upon which is projected graphic data already inputted to a computer. Such a graphic display means could include the projector 122 shown, particularly when the projector 122 is a television projector, interfaced with digital equipment and adapted for use with computer data systems to display alphanumeric and graphic displays, such as the video display equipment available from the General Electric Company.

The present invention permits the projection of an image from below onto tracing media at a plurality of angles of impingement and the overlay of an optically projected image with a drawing or the like on such tracing media. The present invention, in the embodiment depicted in FIG. 7 and described above, permits the general advantages of the present invention to be applied to computer graphic systems, and further permits the image presented by a computer graphic display means to be overlaid with the grid of a computer input means.

INDUSTRIAL APPLICABILITY OF THE INVENTION

The present invention is applicable to the industrial drawing fields wherein visual images are committed to paper, canvas, or other similar medium, or to less tangible media such as through a data input terminal to a computer storage bank or to a computer graphic display means, which fields include that of drafting and architecture, spacial planning, equipment design, and the like and the graphics arts.

The above described particular embodiments of the invention, methods of operation, materials utilized, and combination of elements can vary without changing the spirit of the invention, as particularly defined in the following claims.

I claim:

1. A drawing table comprising:
   an at least substantially translucent panel having a working surface;
   means supporting said panel comprising a frame supported on a pair of spaced apart substantially parallel side walls, wherein said frame is pivotally mounted at its forward edge to the top surfaces of said side walls;
   means for translating said panel to a plurality of positions whereby said working surface can be disposed in a plurality of oblique angles from said top surfaces of said side walls;
   means for illuminating said working surface through said panel seated between said side walls; and
   means for optically projecting an image onto said working surface through said panel at a plurality of angles of impingement and at variable scales comprising a detachable mirror pivotally mounted about its upper edge to mirror support means mounted on the inner faces of said side walls, means for translating said mirror support means to a plurality of positions along the horizontal along said inner faces, a detachable roller that is supported on an axial shaft and disposed between said side walls and adjustable to a plurality of positions along the vertical, wherein said mirror is held at an oblique angle at least partially spaced between said panel and said illuminating means when said mirror support means is in at least one of its positions while said roller is in at least one of its positions, and a projector adapted to project an image to at least one of said panel and mirror, said projector being mounted so as to be translatable to a plurality of positions from said mirror.

2. The drawing table of claim 1 wherein said illuminating means includes:
   a plurality of incandescent lamps; and
   a light diffusing wall disposed between said lamps and said panel.

3. The drawing table of claim 2 further including a plurality of reflector elements disposed adjacent said lamps opposite said light diffusing wall.

4. The drawing table of claim 2 further including means to feed electric current to said lamps at variable levels.

5. The drawing table of claim 1
   wherein said panel includes a graphic data computer input means operable at said working surface.

6. The drawing table of claim 5 wherein said projecting means includes a computer graphic display projection means which interfaces with said graphic data computer input means.

7. The drawing table of claim 1 wherein said projector is moveably mounted for multiple projection directions.

* * * * *